(12) United States Patent
Nakamura

(10) Patent No.: US 11,281,074 B2
(45) Date of Patent: Mar. 22, 2022

(54) IMAGE CAPTURING APPARATUS IMPROVED IN OPERABILITY OF OPERATION SECTION

(71) Applicant: CANON KABUSHIKI KAISHA, Tokyo (JP)

(72) Inventor: Hiroshi Nakamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/016,787

(22) Filed: Sep. 10, 2020

(65) Prior Publication Data

US 2021/0088879 A1 Mar. 25, 2021

(30) Foreign Application Priority Data

Sep. 20, 2019 (JP) .............................. JP2019-171261

(51) Int. Cl.
| | |
|---|---|
| *H04N 5/232* | (2006.01) |
| *H04N 5/225* | (2006.01) |
| *G03B 17/02* | (2021.01) |
| *G03B 17/56* | (2021.01) |
| *H04N 1/00* | (2006.01) |

(52) U.S. Cl.
CPC ............ *G03B 17/02* (2013.01); *G03B 17/563* (2013.01); *H04N 1/00384* (2013.01); *H04N 5/2251* (2013.01); *H04N 5/23216* (2013.01); *G03B 2217/002* (2013.01)

(58) Field of Classification Search
CPC ............ H04N 1/00384; H04N 1/00387; H04N 5/2251; H04N 5/23216; G03B 17/02; G03B 17/563; G03B 2217/002
See application file for complete search history.

(56) References Cited

U.S. PATENT DOCUMENTS

| | | | |
|---|---|---|---|
| 7,239,304 B2 * | 7/2007 | Hoshino | ............... G06F 3/0338 345/157 |
| 2009/0167681 A1 | 7/2009 | Motoe | |
| 2017/0126942 A1 * | 5/2017 | Yamamoto | ........... H04N 5/2253 |

FOREIGN PATENT DOCUMENTS

JP 2009157834 A 7/2009

* cited by examiner

*Primary Examiner* — Daniel M Pasiewicz

(74) *Attorney, Agent, or Firm* — Rossi, Kimms & McDowell LLP

(57) ABSTRACT

An image capturing apparatus improved in the operability of an operation section. The image capturing apparatus includes an OTP, a sub electronic dial, and a grip portion that is provided at a location from where a finger can reach the OTP and the sub electronic dial. The sub electronic dial is arranged concentrically with the OTP.

6 Claims, 4 Drawing Sheets

IMAGE CAPTURING APPARATUS IMPROVED IN OPERABILITY OF OPERATION SECTION

BACKGROUND OF THE INVENTION

Field of the Invention

The present invention relates to an image capturing apparatus including an operation section.

Description of the Related Art

A camera that photographs a still image, a moving image, etc., is provided with a touch operation member at a location where the camera is operable by a finger of a user holding the camera. As a related art, there has been proposed an electronic apparatus in Japanese Laid-Open Patent Publication (Kokai) No. 2009-157834. In the electronic apparatus disclosed in Japanese Laid-Open Patent Publication (Kokai) No. 2009-157834, an optical pointing device has a finger guiding surface which is gently recessed from a surface of the electronic apparatus and curved inward, and a finger guiding member having a transparent close contact surface which is curved outward toward a finger which moves in a state in contact with the finger guiding surface.

In the above-mentioned electronic apparatus disclosed in Japanese Laid-Open Patent Publication (Kokai) No. 2009-157834, the optical pointing device is provided as a single member and is disposed at a location away from other operation members. Therefore, to operate another operation member when a user is operating the optical pointing device with his/her finger, the user is required to remove the finger from the optical pointing device and move the finger to the other operation member. This lowers the operability in performing photographing and makes it difficult to perform a quick operation.

SUMMARY OF THE INVENTION

The present invention provides an image capturing apparatus improved in the operability of an operation section.

The present invention provides an image capturing apparatus comprising a first operation section, a second operation section, and a grip portion that is provided at a location from where a finger can reach the first operation section and the second operation section, wherein the second operation section is arranged concentrically with the first operation section.

According to the present invention, it is possible to provide an image capturing apparatus improved in the operability of the operation section.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. However, the configuration of each of the following embodiments is described only by way of example, and is by no means intended to limit the scope of the present invention.

Figure 1A:
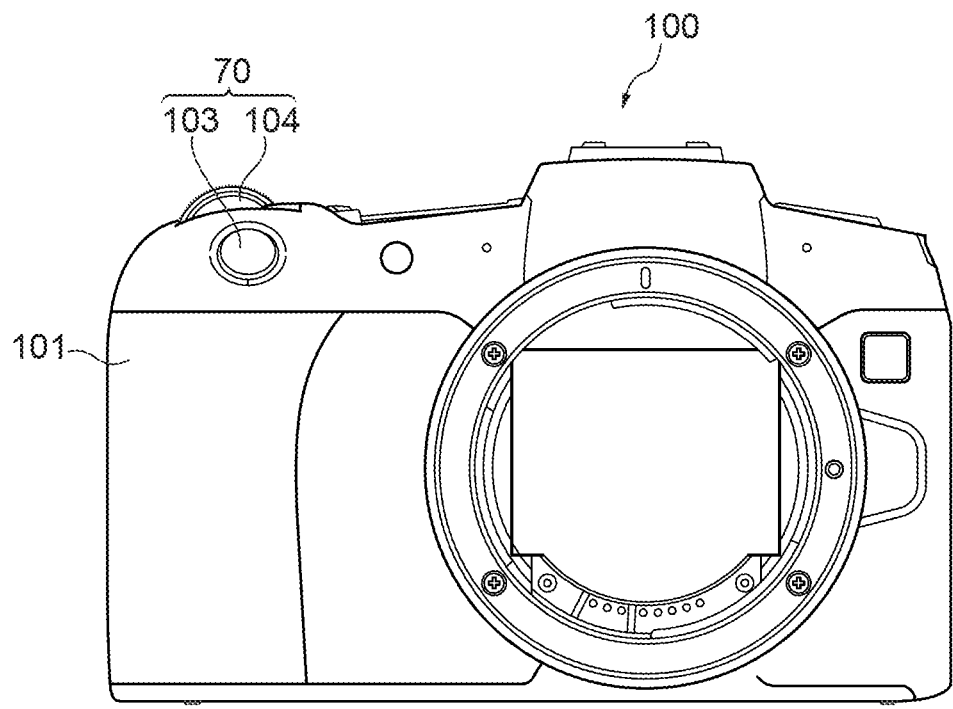
FIGS. 1A and 1B are views showing a body of a digital camera as an image capturing apparatus according to an embodiment of the invention.
Figure 1B:
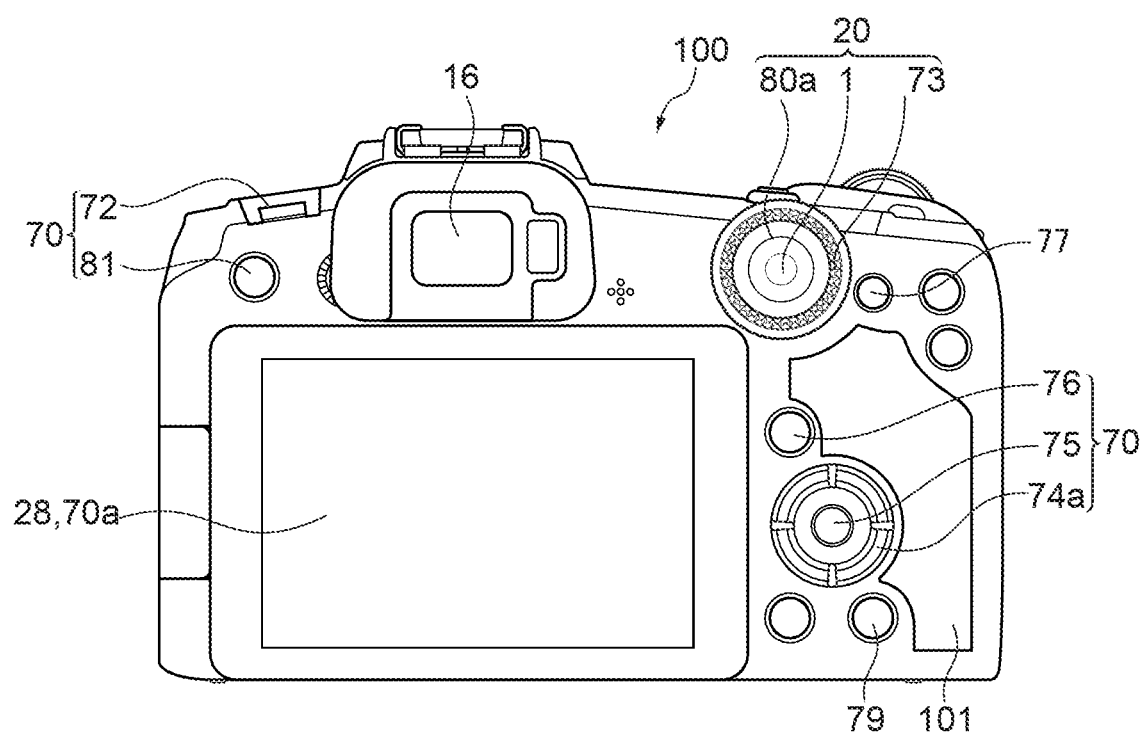

FIGS. 1A and 1B are views showing a body of a digital camera as an image capturing apparatus according to an embodiment of the invention. The digital camera is hereinafter referred to as the camera 100. FIG. 1A is a view of the camera 100 as viewed from a first side (front side). The camera 100 shown in FIG. 1A is in a state in which a photographic lens unit is removed therefrom. FIG. 1B is a view of the camera 100 as viewed from a second side (rear side). The camera 100 is provided with grip portions 101 on the first side and the second side. The grip portion 101 on the first side is formed to protrude such that a user using the camera can stably grasp and operate the camera 100 when performing photographing. A shutter button 103 is an instruction section for giving a photographing instruction. A main electronic dial 104 is a rotation operation member. By rotating the main electronic dial 104, the user can perform operations for changing settings, such as a shutter speed and an aperture value, and like other various operations. The shutter button 103 and the main electronic dial 104 are included in a first switch section 70.

Referring to FIG. 1B, a display section 28 is used for displaying an image and various information. The display section 28 is formed integrally with a touch panel 70a that is capable of detecting a touch operation. The camera 100 is provided with a second switch section 20. The second switch section 20 is an operation member and includes an optical tracking pointer 1, a sub electronic dial 73, and a multifunction button 80a. The optical tracking pointer is hereafter referred to as the OTP. The OTP 1 is an optical device that is capable of receiving a touch operation and corresponds to a first operation section. For example, the OTP 1 may detect a touch operation using an infrared ray sensor. Further, the camera 100 is provided with a finder 16. The sub electronic dial 73 corresponds to a second operation section.

The user can perform a touch operation on the OTP 1 and a slide operation on the same in a desired two-dimensional direction with a finger (thumb) of his/her hand grasping the grip portions 101 while viewing the finder 16. The OTP 1 is assembled on an inner peripheral side of the multifunction button 80a such that the user holding the grip portions 101 can quickly start auto focusing while performing a touch operation and a slide operation. The auto focusing is hereinafter sometimes referred to as "AF". Although the description is given assuming that the multifunction button 80a is set as an AF-ON button in the initial state of the camera 100, the multifunction button 80a in its initial state may be set as a button for a desired function. The multifunction button 80a corresponds to a third operation section.

The OTP 1 is an operation member different from the touch panel 70a integrally provided with the display section 28 and does not have a display function. The user who operates the camera 100 can move the position of a distance measurement frame 305 displayed on the finder 16 or on the display section 28 by operating the OTP 1. The distance measurement frame 305 will be described hereinafter. An object to be moved by operating the OTP 1 is not limited to the distance measurement frame 305. Further, an object to be moved by operating the OTP 1 need not be the same object.

A power switch 72, an operation key 74a, a SET button 75, a Q button 76, and a menu button 81 are further included in the first switch section 70. The power switch 72 is an operation member used for switching the power supply of the camera 100 between ON and OFF. The sub electronic dial 73 is a rotation operation member that makes it possible to execute an operation set, as desired, from a plurality of functions, such as size enlargement/reduction and movement of the distance measurement frame 305, and image scrolling during image reproduction. The sub electronic dial 73 has a click mechanism provided for a rotation member thereof. The sub electronic dial 73 also has a function as a four-direction key configured such that upper, lower, right, and left portions of the rotation member can be pushed in. It is possible to cause the camera 100 to perform an operation corresponding to a pushed-in one of the upper, lower, right, and left portions of the four-direction key.

The operation key 74a is a member configured such that upper, lower, right, and left portions thereof can be pushed in, and it is possible to cause the camera 100 to perform an operation corresponding to a pushed-in one of the portions. The SET button 75 is an operation member mainly used e.g. for determining a selection item. The Q button 76 is an operation member used for performing quick setting. If an operation for pressing the Q button 76 is performed when a photographing screen is displayed, it is made possible to select an item (setting item) from a list of items of settings displayed on the photographing screen, and further, when an operation for selecting a setting item is performed, it is possible to shift the screen to a setting screen of the selected setting item.

The camera 100 is provided with a reproduction button 79. When an operation for pressing the reproduction button 79 is performed during a photographing mode, the operation mode is shifted from the photographing mode to a reproduction mode. After the operation mode is shifted to the reproduction mode, it is possible to display a latest one of images recorded in a recording medium 200, referred to hereinafter, on the finder 16 or the display section 28. The multifunction button 80a is a button which enables the user to handle a plurality of functions. For example, AF (Auto Focus) can be started by operating the multifunction button 80a. As mentioned above, the multifunction button 80a is set as the AF-ON button in the initial state. The multifunction button 80a enables the user to select a desired function from a plurality of functions set as candidates in advance. The menu button 81 is an operation member for configuring various settings of the camera 100. When the menu button 81 is pressed, a menu screen on which the various settings can be set is displayed on the finder 16 or the display section 28. A user can intuitively configure the various settings, using the menu screen displayed on the display section 28, the sub electronic dial 73, the operation key 74a, the SET button 75, and the main electronic dial 104. The finder 16 is a look-through type eyepiece finder used for checking the focus and composition of an optical image of an object formed through the lens unit.

Figure 2:
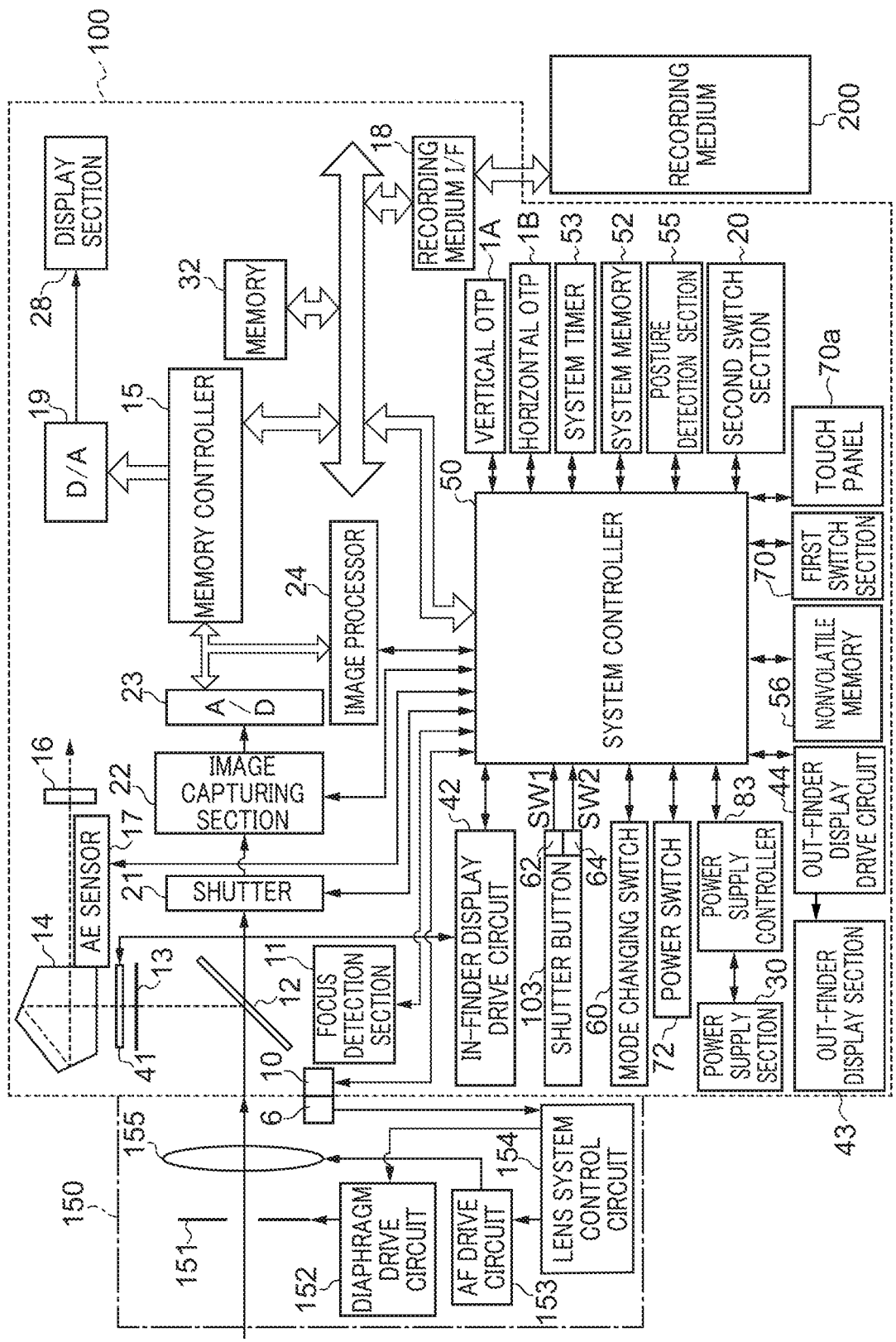
FIG. 2 is a block diagram of the digital camera and a lens unit.

FIG. 2 is a block diagram of the camera 100 and the lens unit, denoted by reference numeral 150. The lens unit 150 includes an interchangeable photographic lens mounted thereon. Although FIG. 2 shows one lens 155, the lens unit 150 may be provided with a plurality of lenses 155. A communication terminal 6 is used by the lens unit 150 so as to communicate with the camera 100. A communication terminal 10 is used by the camera 100 so as to communicate with the lens unit 150. The lens unit 150 communicates with a system controller 50 via the communication terminal 6 and the communication terminal 10. Further, a lens system control circuit 154 controls a diaphragm 151 by controlling a diaphragm drive circuit 152 and adjusts the focus by displacing the position of the lens 155 through control of an AF drive circuit 153. The lens unit 150 is mounted on a camera body including the display section 28 via a mount section to which the lens unit 150 is removably attached. To the lens unit 150, various types of lenses, such as a fixed focal length lens and a zoom lens, can be attached.

Next, the internal configuration of the camera 100 will be described. As shown in FIG. 2, the camera 100 includes a vertically-holding use optical tracking pointer 1A and a horizontally-holding use optical tracking pointer 1B. The vertically-holding use optical tracking pointer 1A or the horizontally-holding use optical tracking pointer 1B corresponds to the OTP 1. The following description is given assuming that the vertically-holding use optical tracking pointer 1A corresponds to the OTP 1. Referring to FIG. 2, the vertically-holding use optical tracking pointer 1A is denoted as the vertical OTP and the horizontally-holding use optical tracking pointer 1B is denoted as the horizontal OTP.

An AE sensor 17 measures a luminance of an image of an object, which is formed on a focusing screen 13 through the lens unit 150 and a quick return mirror (mirror 12). A focus detection section 11 is an auto-focus sensor using a phase-difference detection method for capturing an image entering through the mirror 12 and outputs information on a defocus amount to the system controller 50. The system controller 50 controls the lens unit 150 based on the information on the defocus amount and performs phase-difference AF. The method of AF is not limited to the phase-difference AF, and for example, contrast AF may be employed. Further, the phase-difference AF may be performed, not using the focus detection section 11, but based on a defocus amount detected on an imaging surface of an image capturing section 22 (imaging plane phase difference AF). The mirror 12 is moved up and down by an actuator, not shown, based on an instruction provided from the system controller 50 when performing exposure, live view photographing, moving image photographing, etc. The mirror 12 is for switching the direction of guiding a light flux incident through the lens 155 between a direction toward the finder 16 and a direction toward the image capturing section 22. The mirror 12 is normally arranged to reflect a light flux such that the light flux is guided to the finder 16. In a case where photographing is performed and in a case where live view display is performed, the mirror 12 is flipped upward to retract from an optical path of light flux (mirror up) so as to guide the light flux to the image capturing section 22. Further, the mirror 12 has a central portion formed as a half mirror such that part of light can pass therethrough, thereby causing part of a light flux to enter the focus detection section 11 for performing focus detection.

The user can check the focusing state and the composition of an optical image of an object, which is formed through the lens unit 150, by observing an image formed on the focusing screen 13 through a pentaprism 14 and the finder 16. To the finder 16, an electronic viewfinder (EVF) that displays image signals obtained by the image capturing section 22 may be applied. In this case, the focusing screen 13 and the pentaprism 14 can be omitted. A focal plane shutter (shutter 21) is used for controlling an exposure time of the image capturing section 22 by the control of the system controller 50.

The image capturing section 22 is an image capturing device formed e.g. by a CCD or a CMOS device that converts an optical image to electrical signals. An analog-to-digital converter 23 converts analog signals output from the image capturing section 22 to digital signals. An image processor 24 performs predetermined processing on data output from the analog-to-digital converter 23 (digital signal data) or data output from a memory controller 15. Examples of the predetermined processing include resizing, such as pixel interpolation and size reduction, and color conversion. Further, the image processor 24 performs predetermined calculation processing using captured image data. The system controller 50 performs exposure control, ranging control, etc., based on results of the calculation processing. With these controls, AF (Auto Focus) processing, AE (Automatic Exposure) processing, and EF (Electronic Flash pre-emission) processing are performed by a TTL (Through The Lens) method. Further, the image processor 24 performs predetermined calculation processing using captured image data. AWB (automatic white balance) processing by the TTL method is performed based on calculation results obtained by the calculation processing.

A memory 32 stores image data captured by the image capturing section 22 (digital data converted by the analog-to-digital converter 23) and image data to be displayed on the display section 28. The memory 32 has sufficient storage capacity to store a predetermined number of still images, and a predetermined duration of moving images and audio data. The memory 32 may be either a removable recording medium, such as a memory card, or an internal memory.

The display section 28 is a rear monitor for displaying an image and is provided on the rear of the camera 100 as shown in FIG. 1B. A digital-to-analog converter 19 converts image display data stored in the memory 32 from digital signals to analog signals and outputs the analog signals to the display section 28. With this, an image is displayed on the display section 28. The display section 28 may be a desired display, such as a liquid crystal display or an organic EL display.

A posture detection section 55 is a sensor for detecting a posture of the camera 100 based on an inclination angle thereof. A nonvolatile memory 56 is a memory electrically erasable and recordable by the system controller 50, and for example, an EEPROM is applied thereto. The nonvolatile memory 56 stores constants for the operation of the system controller 50, programs for operating the camera 100, etc.

The system controller 50 incorporates at least one processor and controls the overall operation of the camera 100. The processor of the system controller 50 executes the programs stored in the nonvolatile memory 56, whereby the various types of control of the camera 100 are performed. The constants and variables for the operation of the system controller 50, the programs read from the nonvolatile memory 56, etc., are loaded into a system memory 52. Further, the system controller 50 also performs display control by controlling the memory 32, the digital-to-analog converter 19, the display section 28, and so forth.

A system timer 53 is a timer for measuring time used for various types of control and time of a built-in clock. A mode changing switch 60 is for switching the operation mode of the system controller 50 to one of a plurality of modes (such as a still image photographing mode and a moving image photographing mode). The still image photographing mode includes a P mode (program AE), an M mode (manual mode), etc. It is also possible to employ a configuration in which after the screen is once switched to the menu screen by the mode changing switch 60, the operation mode can be switched to one of these modes included in the menu screen. Similarly, the moving image photographing mode may also include a plurality of modes. In the M mode, a user can set an aperture value, a shutter speed, and an ISO sensitivity, and photographing is performed with an exposure set by the user.

A first shutter switch 62 is turned on by half operation, i.e. so-called "half press" of the shutter button 103 provided on the camera 100 (by photographing preparation instruction) to generate a first shutter switch signal SW1. When the first shutter switch signal SW1 is generated, the operations of the AF (Auto Focus) processing, the AE (Auto Exposure) processing, the AWB (Auto White Balance) processing, the EF (Electronic Flash pre-emission) processing, and so forth are started. Further, photometry by the AE sensor 17 is also performed. A second shutter switch 64 is turned on by complete operation, i.e. so-called "full press" of the shutter button 103 (by photographing instruction) to generate a second shutter switch signal SW2. When the second shutter switch signal SW2 is generated, the system controller 50 starts a sequence of photographing processing operations from reading of signals from the image capturing section 22 to writing of image data in the recording medium 200.

A power supply controller 83 is comprised of a battery detection circuit, a DC-DC converter, a switch circuit for switching blocks to be energized, etc. The power supply controller 83 detects whether or not a battery is attached, a battery type, and a battery remaining amount. Further, the power supply controller 83 controls the DC-DC converter based on detection results and an instruction from the system controller 50 to apply a necessary voltage to the components including the recording medium 200, over a required time period. The power switch 72 is for switching the power supply of the camera 100. A power supply section 30 is formed by a primary battery, such as an alkaline battery or a lithium battery, or a secondary battery, such as an NiCd battery, an NiMH battery, or an Li battery, and an AC adapter. A recording medium interface 18 interfaces with the recording medium 200, such as a memory card or a hard disk. The recording medium 200 is a recording medium for recording photographed images, such as a memory card, and is implemented e.g. by a semiconductor memory or a magnetic disk. Further, an in-finder display drive circuit 42 that drives an in-finder display section 41 as a component of the finder 16 is connected to the system controller 50. Further, an out-finder display drive circuit 44 that drives an out-finder display section 43 provided outside the finder 16 is connected to the system controller 50.

As mentioned above, the camera 100 has the touch panel 70a that is capable of detecting a touch on the display section 28. For example, the touch panel 70a is configured such that the transmittance of light does not interfere with display on the display section 28, and is attached to an upper layer of the display surface of the display section 28. Further, input coordinates on the touch panel 70a are associated with display coordinates on the display section 28. With this, it is possible to configure a GUI (Graphical User Interface) which enables the user to directly operate a screen displayed on the display section 28. The system controller 50 can detect an operation input to the touch panel 70a or a state of the touch panel 70a.

The system controller 50 can detect a touch operation newly performed by a finger or pen which has not been in contact with the touch panel 70a, i.e. the start of a touch operation (hereinafter referred to as "a touch-down"). Further, the system controller 50 can detect a state in which the touch panel 70a is being touched by a finger or pen (hereinafter referred to as "a touch-on"). Further, the system controller 50 can detect a state in which a finger or pen is moving while touching the touch panel 70a (hereinafter referred to as "a touch-move"). Further, the system controller 50 can detect removal of a finger or pen which has been in contact with the touch panel 70a, i.e. the end of the touch operation (hereinafter referred to as "a touch-up"). Further, the system controller 50 can detect a state in which the touch panel 70a is touched by nothing (hereinafter referred to as "a touch-off"). The system controller 50 may detect an operation or state other than the above-mentioned operations including a touch-down.

When a touch-down is detected, the system controller 50 also detects a touch-on at the same time. The touch-on is continuously detected unless a touch-up is detected after detection of the touch-down. A touch-move is detected in a case where the touched position is moved in a state in which the touch-on is being detected. Even when the touch-on is detected, if the touched position is not moved, a touch-move is not detected. After detecting a touch-up of all fingers or a pen which have/has been in contact with the touch panel 70a, the system controller 50 detects a touch-off. Further, the system controller 50 may be configured to detect e.g. a pressed state in which a pressure of a predetermined level or more is applied to the touch panel 70a in a touch-on state.

Information concerning the above-mentioned operations or states, position coordinates at which the finger or pen touches the touch panel 70a, and so forth is notified to the system controller 50 via an internal bus. The system controller 50 determines an operation performed on the touch panel 70a based on the information notified thereto. As for the touch-move, a moving direction in which the finger or pen moves on the touch panel 70a can also be determined based on changes of the vertical and horizontal coordinates of the position on the touch panel 70a. Further, when a touch-up is performed on the touch panel 70a via a certain touch-move thereon after a touch-down is performed thereon, a stroke is drawn. An operation of quickly drawing a stroke is referred to as a flick. The flick is an operation of quickly moving a finger over a certain distance while keeping the finger in contact with the touch panel 70a and then moving the finger off the same. In other words, the flick is an operation of quickly moving a finger on the touch panel 70a as if flicking the finger against the touch panel 70a. When a touch-move over a predetermined distance or more has been performed at a predetermined speed or higher is detected, and, in succession, a touch-up is detected, the system controller 50 determines that a flick has been performed. Further, when a touch-move over a predetermined distance or more has been performed at a speed lower than the predetermined speed, the system controller 50 determines that a drag has been performed.

To the touch panel 70a, various types of touch panels can be applied, such as a resistive type, a capacitance type, a surface acoustic wave type, an infrared type, an electromagnetic induction type, an image recognition type, and an optical sensor type. Although there are detection methods including a method of detecting a touch by detecting a contact with the touch panel or a method of detecting a touch by detecting the proximity of a finger or pen to the touch panel, any suitable method may be applied.

Next, the operation of the OTP 1 will be described. The system controller 50 calculates, based on information output from the OTP 1, the direction of motion performed by a slide operation on the OTP 1 (hereinafter referred to as the moving direction) in eight directions: upward, downward, leftward, rightward, leftward and upward, leftward and downward, rightward and upward, and rightward and downward directions. The system controller 50 calculates the amount of movement of a touched position caused by a slide operation in the two-dimensional directions of an X-axis direction and a Y-axis direction (hereinafter referred to as the moving amounts (X, Y)) based on information output from the OTP 1. From the above, the system controller 50 can detect an operation performed on the OTP 1 or a state of the OTP 1. This is similarly applied to detection of an operation performed on the touch panel 70a or a state of the touch panel 70a.

In a case where the OTP 1 is newly touched by a user's finger in a non-touched of the OTP 1, the system controller 50 detects a touch-down. In a case where the user's finger is in contact with the OTP 1, the system controller 50 detects a touch-on. In a case where the user's finger is moving while touching the OTP 1, the system controller 50 detects a touch-move. In a case where the finger which has been in contact with the OTP 1 is removed from the OTP 1, the system controller 50 detects a touch-up. In a case where the OTP 1 is touched by nothing, the system controller 50 detects a touch-off.

When a touch-down is detected, a touch-on is also detected at the same time. Unless a touch-up is detected after detecting the touch-down, normally, the touch-on is continuously detected. A touch-move is detected when the touch-on is detected and also the touched position is being moved. That is, even when the touch-on is detected, if the moving amounts (X, Y) are equal to 0, a touch-move is not detected. Upon detecting a touch-up of all fingers or a pen which have/has been in contact with the OTP1, a touch-off is detected.

The system controller 50 determines, based on a detected operation or state, moving direction, and moving amounts (X, Y), whether or not an operation on the OTP 1 (touch operation) has been performed. As for a touch-move, the system controller 50 detects movement in the eight directions of the upward, downward, leftward, rightward, leftward and upward, leftward and downward, rightward and upward, and rightward and downward directions, or in the two-dimensional directions of the X-axis direction and the Y-axis direction, on the OTP 1. In a case where movement in one of the eight directions, or movement in one or both of the two-dimensional directions of the X-axis direction and the Y-axis direction is detected, the system controller 50 determines that a slide operation has been performed. In a case where an operation of touching the OTP 1 with a finger and removing the finger from the OTP 1 within a predetermined time period without performing a slide operation is detected, the system controller 50 determines that a tap operation has been performed. As mentioned hereinabove, the OTP 1 of the present embodiment may be an infrared type touch sensor, or a touch sensor of another type, such as a resistive type, a surface acoustic wave type, a capacitance type, an electromagnetic induction type, an image recognition type, and an optical sensor type.

Figure 3A:
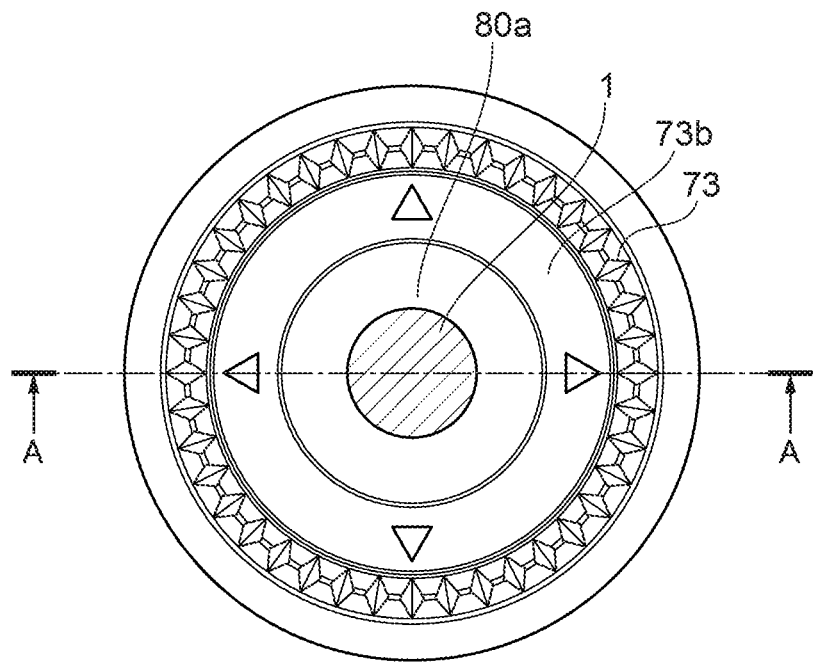
FIGS. 3A and 3B are views showing a second switch section.
Figure 3B:
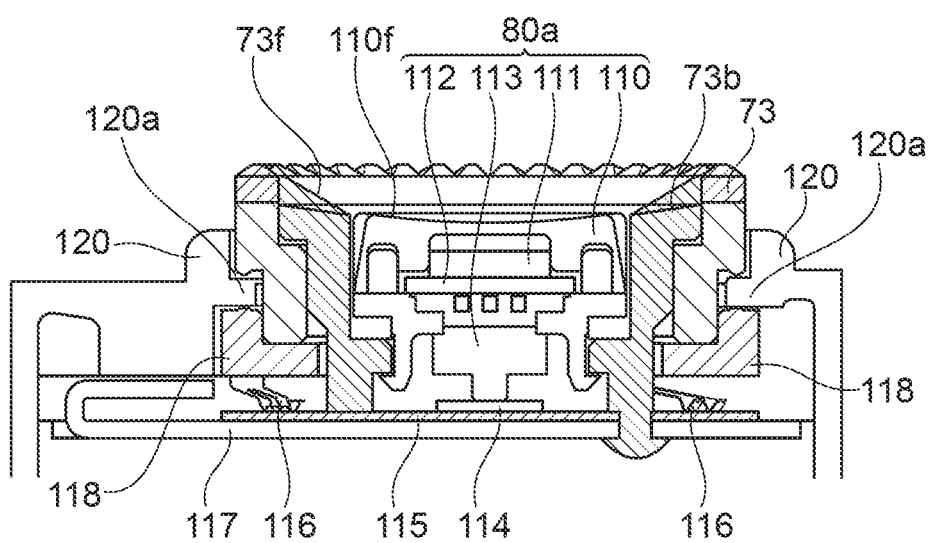

Next, the second switch section 20 which is one of the operation members of the camera 100 will be described. FIGS. 3A and 3B are views showing the second switch section 20. FIG. 3A is a front view of the second switch section 20, and FIG. 3B is a cross-sectional view taken along A-A in FIG. 3A. The sub electronic dial 73 having a knurled shape generates a frictional force for performing a rotation operation using a finger. A fixed portion 73b is arranged in an inner diameter portion of the sub electronic dial 73, and triangle marks for indicating the functions of the four-direction key are engraved on an upper surface of the fixed portion 73*b*. The triangle marks engraved on the fixed portion 73*b* each function as a pressed-in portion, and when one of the triangle marks of the four-direction key is pressed in, one of the upward, downward, rightward, and leftward directions can be designated. It is preferred that the fixed portion 73*b* is fixed even when the sub electronic dial 73 is rotated. Further, instead of being a knurled dial member, the sub electronic dial 73 may bet a desired member for performing a rotation operation. For example, the sub electronic dial 73 may be a dial for performing a rotation operation using the electrostatic capacitance method.

As shown in FIG. 3A, the sub electronic dial 73 is concentrically arranged about the OTP 1. Further, the multifunction button 80*a* is arranged coaxially with the OTP 1, and the upper surface of the fixed portion 73*b* (surface on which the triangle marks indicating the functions of the four-direction key are engraved) is arranged on an outer peripheral side of the multifunction button 80*a*. Further, the sub electronic dial 73 is arranged on an outer peripheral side of the fixed portion 73*b*. The components appearing in FIG. 3A function as the operation section and are concentrically arranged about the OTP 1.

As shown in FIG. 3B, the sub electronic dial 73 is rotatably and slidably fitted in a rib 120*a* formed on an exterior member 120. A contact terminal member 116 and a click member 118 are fixed to the sub electronic dial 73 by adhesion or heat welding, and are rotatable in unison with the sub electronic dial 73. A click feeling is generated on the sub electronic dial 73 by a click mechanism of the click member 118. The click mechanism can employ an arbitrary method, such as a method using a spring force and a method using a magnetic force.

When the sub electronic dial 73 is rotated, the contact terminal member 116 which rotates in unison with the sub electronic dial 73 slidably moves on a flexible substrate 115, and a predetermined detection portion arranged on the flexible substrate 115 obtains a signal for detecting rotation based on a detection pattern. The method of detecting rotation of the sub electronic dial 73 is not limited to the above-mentioned method, and an arbitrary method, such as a method using a circular magnet and a magnetism detection element or a method using a shielding member and a PR (piezoresistive) element, can be employed. An OTP sensor 111 as a sensor for detecting an operation performed on the OTP 1 is mounted on a circuit board 112 and fixed to a holding member 113. An optical window 110 as an external operation portion of the OTP sensor 111 is arranged in a detection direction of the OTP sensor 111 and is fixed to the holding member 113.

The holding member 113 has a shape causing a pressing force to act on a pressure sensitive switch 114 which is surface-mounted on the flexible substrate 115. The holding member 113 generates a click force of the multifunction button 80*a* and detects a click signal. In the present embodiment, the OTP 1 is formed integrally with the multifunction button 80*a*, and the pressure sensitive switch 114 which functions as a pressure sensing section senses a pressing force applied to the OTP 1 and the multifunction button 80*a*. In an area between an inner peripheral side of the sub electronic dial 73 and an outer peripheral side of the multifunction button 80*a*, the above-described fixed portion 73*b* is arranged. A fixing member 117 is e.g. a sheet metal. The fixing member 117 is fixed to the exterior member 120, and the fixed portion 73*b* is fixed to the fixing member 117 e.g. by heat caulking or adhesion. With this arrangement, it is possible to employ a suitable configuration in which the sub electronic dial 73 is made rotatable and the multifunction button 80*a* and the OTP 1 are prevented from rotating.

A fixed portion surface 73*f* is formed into a curved surface shape or a flat shape for smoothly connecting between the knurled portion of the sub electronic dial 73 and an optical window surface 110*f*. In the present embodiment, the sub electronic dial 73 is disposed at a location higher than the optical window surface 110*f*, and the OTP 1 is disposed at a location recessed from the sub electronic dial 73. With this, a conical shape is formed by the sub electronic dial 73, the fixed portion surface 73*f*, and the optical window surface 110*f*. The fixed portion surface 73*f* can employ a desired shape connecting between the sub electronic dial 73 and the optical window surface 110*f*. With the above-described shape, when the user operates the OTP 1 by sliding his/her finger on the optical window surface 110*f*, it is possible to suppress lowering of the operability, caused by the user's finger caught by the knurled portion of the sub electronic dial 73.

Figure 4A:
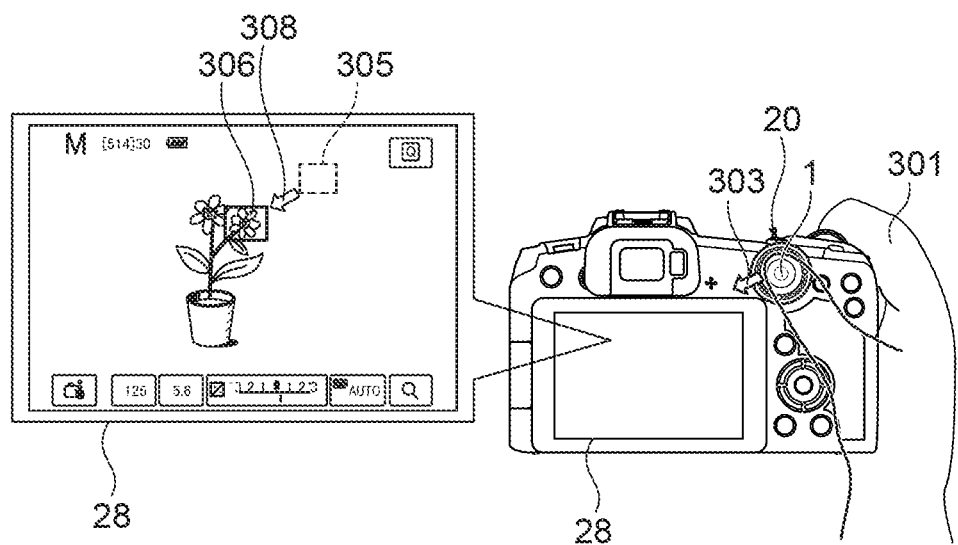
FIGS. 4A and 4B are views showing an example of operation of the second switch section.
Figure 4B:
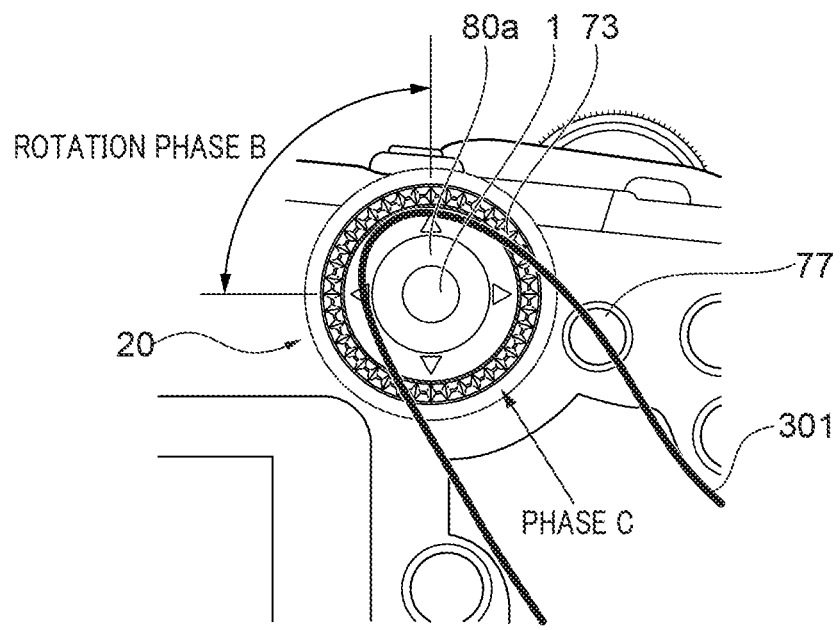

FIGS. 4A and 4B are views showing an example of the operation of the second switch section 20 as one of the operation members provided on the camera 100. As shown in FIG. 4A, the user holds the grip portions 101 with his/her hand 301 and operates the operation member (second switch section) 20 with his/her thumb. An arrow 303 indicates a direction in which the user performs a slide operation on the OTP 1 (direction of a touch-move). The system controller 50 detects the direction of the slide operation indicated by the arrow 303. The user can perform a slide operation in a desired direction of the OTP 1.

In FIG. 4A, an enlarged illustration of the screen of the display section 28 is additionally shown. As described above, when a slide operation of the OTP 1 is performed by the user, the distance measurement frame 305 of the display section 28 moves in the same direction as the direction of the slide operation. In FIG. 4A, the distance measurement frame 305 before moving is indicated by a broken line rectangular area, and the distance measurement frame 305 after moving is indicated by a solid line rectangular area. An arrow 308 indicates a direction in which the distance measurement frame 305 moves on the display section 28, which is the same as the direction in which the slide operation is performed on the OTP 1 by the user.

Here, it is conceivable that the user gives various instructions to improve the operability when moving the distance measurement frame 305 to the position of an object 306 (a flower in the illustrated example in FIG. 4A) by operating the OTP 1. Examples of the various instructions include arbitrary instructions, including instructions for changing the shape of the distance measurement frame 305, changing the moving speed, and changing a ranging target. That is, the operation for the various instructions is an operation associated with an operation performed on the OTP 1. In this case, in a conventional camera, members (e.g. a button 77 in FIG. 1B) used by the user to give the various instructions are arranged at locations distant from the OTP 1. In this case, when giving any of the various instructions for improving the operability, the user is required to remove his/her finger from the OTP 1 and press an associated button provided at a location distant from the OTP 1. Therefore, in a case where the user provides any of the various instructions while performing an operation on the OTP 1, a movement operation for removing the user's finger from the OTP 1 and moving the same to another button for providing the instruction is required to be performed, and hence the operability is lowered. Further, it is difficult to quickly perform the operation.

On the other hand, in the present embodiment, it is possible to assign functions of executing any of the above-mentioned various instructions to the sub electronic dial 73. In a case where the user provides any of the various instructions while operating the OTP 1, the user can move the his/her finger to the sub electronic dial 73 without removing the finger from the OTP 1. Since the sub electronic dial 73 and the OTP 1 form the operation member (the second switch section 20), the operability when the user gives the various instructions while operating the OTP 1 is improved. Further, the user can quickly perform the operation.

Further, it is possible to assign the functions of executing any of the above-mentioned various instructions to the multifunction button 80a. Since the OTP 1 is provided inside the multifunction button 80a, in a case where the user gives the above-mentioned various instructions while operating the OTP 1, the user is not required to remove his/her finger from the OTP 1. With this, the movement operation for removing the user's finger from the OTP 1 and moving the same to another button for giving the various instructions is not required to be performed, and hence the operability is improved. Further, the user can quickly perform the operation. Similarly, the functions of executing any of the various instructions may be assigned to the four-direction key of the fixed portion 73b. The fixed portion 73b also forms part of the operation member (the second switch section 20), and hence the operability when the user gives any of the various instructions while operating the OTP 1 is improved. Further, the user can quickly perform the operation. From the above, it is possible to perform photographing as desired.

FIG. 4B is an enlarged view of the second switch section 20 of the camera 100. As shown in FIG. 4B, the thumb of the user's hand 301 holding the grip portions 101 is operating the second switch section 20. A rotation phase B indicates a phase in which the user's thumb passes on the OTP 1 in a case where the user rotationally operates the sub electronic dial 73 to perform an operation associated with the operation of the OTP 1. Here, the user holds the grip portions 101 with the hand 301 and hence the phase in which the thumb of the user's hand 301 passes on the OTP 1 may be determined in association with a positional relationship between the grip portion 101 on the second side and the sub electronic dial 73. In the illustrated example in FIG. 4B, the rotation phase B is within a range of approximately 90 degrees. In this case, the rotation phase B corresponds to an upward key and a leftward key of the four-direction key of the sub electronic dial 73. Note that the range of the rotation phase B may be a desired angle. Further, the range of the rotation phase B may be set by a user as desired.

As described hereinabove, the OTP 1 is arranged inside the sub electronic dial 73. Therefore, when the user performs an operation on some part of the sub electronic dial 73, which is within the range of the rotation phase B, there is a possibility that an operation which is not intended by the user is performed on the OTP 1. To prevent this, in accordance with detection of an operation performed by a user on part of the sub electronic dial 73, which is within the range of the rotation phase B, the system controller 50 disables the operation on the OTP 1 continuously or for a certain time period. This prevents an operation which is not intended by the user from being performed.

Here, there is a case where the sub electronic dial 73 is not provided with a function of detecting a rotation phase. In this case, to detect an operation which is not intended by a user, the system controller 50 determines whether or not the sub electronic dial 73 has been continuously rotated through not smaller than a predetermined angle. More specifically, the system controller 50 determines whether or not the sub electronic dial 73 has been continuously rotated through not smaller than an angle through which the sub electronic dial 73 reaches the rotation phase B from a phase C which is most distant from the range of the rotation phase B.

The system controller 50 determines whether or not the sub electronic dial 73 has been continuously rotated through not smaller than half of a value obtained by subtracting the range of the rotation phase B from 360°. Here, since the range of the rotation phase B is 90°, the system controller 50 determines whether or not the sub electronic dial 73 has been rotated through not smaller than 135°. If the sub electronic dial 73 has been continuously rotated not smaller than 135°, the finger of the user reaches the rotation phase B having a possibility of erroneous detection. In this case, the system controller 50 disables the function of the OTP 1. The rotation phase B can be changed as desired according to the layout, such as the sizes and positions of the grip portion 101, the multifunction button 80a, and the sub electronic dial 73. Further, the rotation phase B also changes according to the size of the thumb of the user's hand 301, and hence the rotation phase B may be configured such that it can freely specified by a user's operation.

As described above, in the present embodiment, the second switch section 20 including the OTP 1 and the sub electronic dial 73 is provided within a range which a finger can reach from the grip portion 101, and the sub electronic dial 73 is arranged concentrically with the OTP 1. Therefore, the user can move his/her finger to the sub electronic dial 73 without removing the finger when operating the OTP 1, and hence the operability is improved. Further, the user can quickly perform the operation.

Although in the present embodiment, the description is given of the case where photographing is performed by the camera 100, the present invention can also be applied to a case where an image photographed by the camera 100 is reproduced. For example, an image enlarging function, a function of moving an enlarged portion, and an image scrolling function can be assigned to the multifunction button 80a, the OTP 1, and the sub electronic dial 73, respectively. In a case where a user continuously performs an operation of checking a lot of reproduced images, it is possible to reduce the moving amount of the user's finger by the operation, which improves the operability. Further, the user can quickly perform the operation. Further, the various types of control related to the OTP 1 can also be applied to a touch panel, a joystick that designates a direction by inclining a member thereof, a rotation dial, a physical button, etc.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-171261 filed Sep. 20, 2019, which is hereby incorporated by reference herein in its entirety.

What is claimed is:

1. An image capturing apparatus comprising:
an external member;
a first input device that receives a touch operation;

a second input device being a dial member rotatably and slidably fitted to the external member and located on an outer peripheral side of the first input device;

a third input device that is operable by a user to handle a plurality of functions, is arranged coaxially with the first input device at a location on an inner peripheral side of the second input device, and comprises portions that are manually operable by a user to designate upward, downward, rightward, and leftward directions, respectively;

a pressure sensor that senses a pressing force applied to the first input device and a pressing force applied to the third input device;

a flexible substrate comprising a surface on which the pressure sensor is mounted;

a fixed portion located in an area between the inner peripheral side of the second input device and an outer peripheral side of the third input device, and fixing both the first input device and the third input device thereon;

a base on which the flexible substrate is formed and the fixed portion is fixed;

a grip that is provided at a location from where a finger can reach the first input device, the second input device, and the third input device;

a contact terminal that is rotatable in unison with the second input device; and a detection pattern mounted on the surface of the flexible substrate, on which the contact terminal slidably moves.

2. The image capturing apparatus according to claim 1, wherein the second input device receives an operation associated with an operation performed on the first input device.

3. The image capturing apparatus according to claim 1, further comprising a display, wherein the first input device is an optical device that is operable by a user to operate an object displayed on the display.

4. The image capturing apparatus according to claim 1, wherein the first input device is located at a position recessed from the second input device.

5. The image capturing apparatus according to claim 1, wherein the second input device is rotatably operable, and in a case where an operation performed with respect to a rotation phase of a predetermined range of the second input device is detected, an operation on the first input device is disabled continuously or for a certain time period.

6. The image capturing apparatus according to claim 1, wherein in a case where an operation of continuously rotating the second input device through not smaller than a predetermined angle is detected, an operation on the first input device is disabled continuously or for a certain time period.

* * * * *